United States Patent [19]

Fouilloy et al.

[11] Patent Number: 5,387,933
[45] Date of Patent: Feb. 7, 1995

[54] DETECTOR-FITTED CAMERA PROVIDED WITH ELECTRONIC PROTECTION

[75] Inventors: Jean-Pierre Fouilloy, Velizy; Francois-Xavier Doittau, Behoust/Orgerus, both of France

[73] Assignee: Thomson-CSF, Puteaux, France

[21] Appl. No.: 995,693

[22] Filed: Dec. 23, 1992

[30] Foreign Application Priority Data

Dec. 31, 1991 [FR] France ............................ 91 16380

[51] Int. Cl.$^6$ ............................................. H04N 5/335
[52] U.S. Cl. ................................. 348/294; 348/297
[58] Field of Search .............. 358/209, 213.11, 211, 358/213.26, 213.27; 250/208.1; H04N 5/335; 348/216, 220, 221, 294, 295, 297, 307, 229

[56] References Cited

U.S. PATENT DOCUMENTS

| | | | |
|---|---|---|---|
| 4,397,429 | 8/1983 | Fouilloy | 244/3.11 |
| 4,761,652 | 8/1988 | Piroulli et al. | 342/53 |
| 5,038,214 | 8/1991 | Miida | 348/294 |
| 5,113,263 | 5/1992 | Audaire | 358/213.11 |
| 5,149,969 | 9/1992 | Fouilloy | 250/334 |
| 5,216,510 | 6/1993 | Amingual et al. | 358/213.15 |
| 5,233,180 | 8/1993 | Tsuruta et al. | 250/208.1 |

FOREIGN PATENT DOCUMENTS 0122588 10/1984 European Pat. Off. ....... H04N 5/21
56-132064 1/1982 Japan ............................ H04N 5/30

*Primary Examiner*—Michael T. Razavi
*Assistant Examiner*—Tuan V. Ho
*Attorney, Agent, or Firm*—Oblon, Spivak, McClelland, Maier & Neustadt

[57] ABSTRACT

In a system for the protection of cameras against countermeasures using, in particular, laser rays to saturate the sensors of the detector of the camera, each of the usual integration circuits connected respectively to the n sensors is preceded by an intermediate integration circuit, the contents of which are transferred into the usual integrated circuit at a rate higher than that used for the transfer of the contents of the usual integration circuit; the contents of the intermediate integration circuit are measured; the transfer of these contents is prevented when their value is excessively high. Application to detector-fitted cameras working in the infrared, visible or ultra-violet ranges.

4 Claims, 2 Drawing Sheets

DETECTOR-FITTED CAMERA PROVIDED WITH ELECTRONIC PROTECTION

BACKGROUND OF THE INVENTION

The present invention relates to the protection of detector-fitted cameras against jamming, dazzling or even destruction by what may be called optronic countermeasures.

In the field of optronic countermeasures, there is a known method of detecting a camera through the reflection of the beam of a continuous low-powered laser, and then aiming a power laser that gives pulses towards the camera that has been localized, to illuminate all or a part of its optical detector in order to dazzle or even damage it. To this end, the two lasers work at a wavelength for which the optical system of the camera is transparent.

The dazzling of the camera by the beam of the power laser is due to a saturation of all or a portion of the sensors that constitute the detector, and results in images having a surface that is partially or totally saturated. If the frequency of the pulses of the laser is greater than the frequency of the images, then this saturation systematically affects all the images.

A known way of protecting a camera against these countermeasures is to identify the monochromatic radiation of the lasers by discrimination between the narrow spectrum of this radiation and the wide spectrum of the natural sources and to stop the frame scanning of the camera or inhibit its amplification circuits throughout the duration of the pulses of the disturbing laser. To have a loss of image corresponding substantially to that part of the image alone which is concerned by the laser pulse, it is difficult to eliminate only that part of the scanning frame which is disturbed, and in the so-called second-generation cameras, namely cameras where the detection is immediately followed by a multiplexing operation with a single amplifier at the output of the multiplexer, it is difficult to inhibit the amplifier solely during the passage of the disturbed signals.

SUMMARY OF THE INVENTION

The present invention is designed to circumvent or at least to reduce these drawbacks.

This result is obtained by controlling the signals given by the sensor and by eliminating those signals whose abnormally high value shows that they come from an operation of observation that is being disturbed by a jammer.

According to the present invention, there is provided a camera with electronic protection against countermeasures comprising, in series, a detector having n sensors, where n is a positive integer, to produce charges, n coupling elements respectively connected to the n sensors to receive the charges therefrom and n main integration circuits respectively connected to the n coupling elements to receive the charges therefrom and transmit them at a given frequency, wherein every given coupling element among the n coupling elements comprises an intermediate integration circuit to accumulate charges produced by the sensor to which the given coupling element is connected and transmit them at a frequency greater than the given frequency and wherein the camera comprises measuring means to measure the charge of the n intermediate integration circuits and control means to modify the contents of the intermediate integration circuits when at least one of the charges measured by the measuring means exceeds a given value.

BRIEF DESCRIPTION OF THE DRAWINGS

The present invention will be understood more clearly and other features will emerge from the following description and from the figures relating thereto, of which.

MORE DETAILED DESCRIPTION

Figure 1:
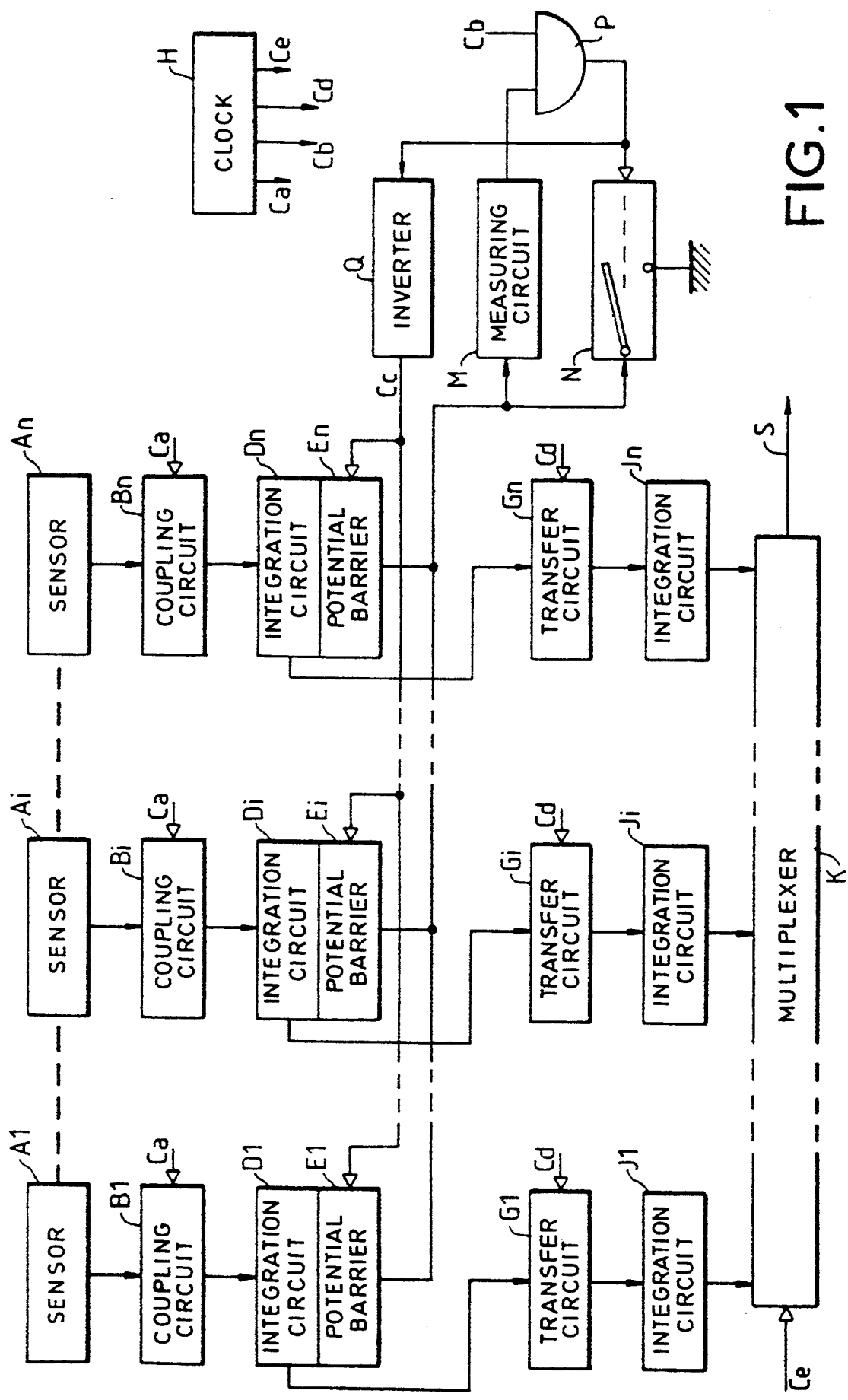
FIG. 1 shows a partial electrical diagram of a camera according to the invention.

FIG. 1 pertains to a camera provided with a detector constituted by an array of sensors, of which three, namely A1, Ai, An are shown in the figure. The index n corresponds to the total number of sensors of the array and the index i represents an integer greater than 1 and smaller than n.

Each of the sensors is connected by a sequence of circuits of its own to an input, proper to itself, of a multiplexer K provided with an output line S. To simplify the drawing, and since all the n sequences of circuits relating to the n sensors are identical, only the sequences of circuits relating to the sensors A1, Ai and An have been shown and the elements proper to them are designated by capital letters respectively followed by a 1, an i or an n. The other elements, such as the multiplexer K, which are common to the n sequences of circuits, are designated in FIG. 1 by a capital letter followed by no other reference element. As for the different control signals, they are designated by the letter C followed by the lower-case letter a, b, c, d or e.

Figure 2:
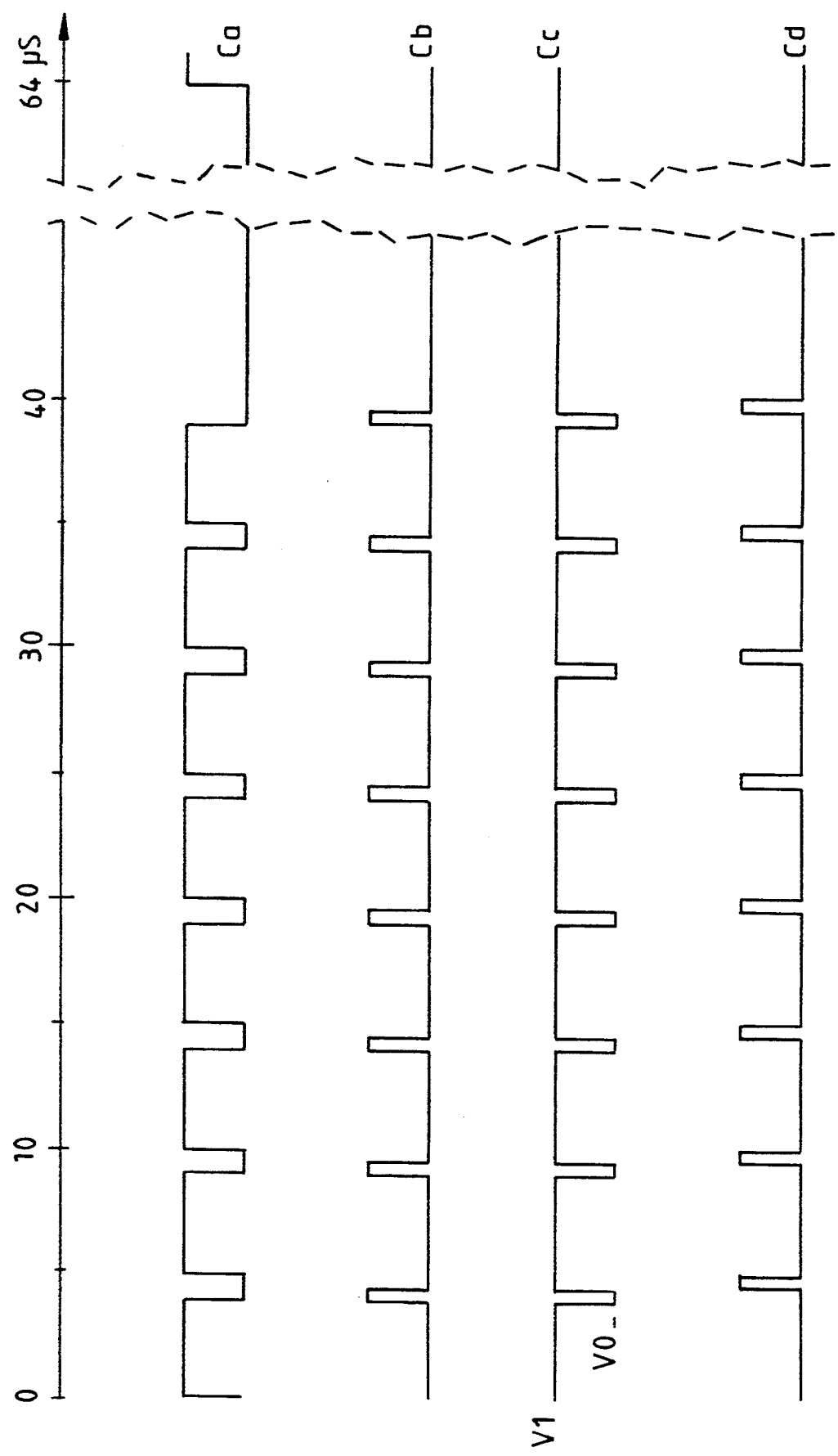
FIG. 2 shows a timing diagram relating to the diagram of FIG. 1.

The output of the sensor Ai is connected to the input of a coupling circuit Bi controlled by the signal Ca given by a clock H and shown in FIG. 2. The output of the circuit Bi is connected to the input of an integration circuit which shall be called an intermediate integration circuit, Di, associated with a potential barrier Ei. A port of the integration circuit Di is connected to the input of a transfer circuit Gi controlled by a signal Cd of the clock H. The signal Cd is shown in FIG. 2.

The output of the transfer circuit Gi is connected to the input of an integration circuit which shall be called a main integration circuit, Ji, the output of which is connected to the multiplexer K. The command for the transfer by the multiplexer K is provided by a signal Ce given by the clock H.

A port of the potential barrier Ei is connected to a measuring circuit M and to a switch N. The output of the measuring circuit M is connected to the second input of an AND gate P which receives, at its first input, a control signal Cb given by the clock H and shown in FIG. 2. The output of the AND gate P is connected to the input of an inverter Q, which controls the potential barriers such as Ei, and to the control input of the switch N in order the control the ground connection of the input of this switch.

In the example described, as is shown by the signals of FIG. 2, the electrons given by the sensor A1 are almost entirely integrated during 32 microseconds, in periods of 64 microseconds, i.e. at the television line rate, and the integration time divided into 8 time intervals of 4 microseconds separated by 1 microsecond.

During each 4-microsecond interval of time, the detector A1 is connected to the intermediate integration circuit Di by the coupling circuit Bi which is a switch constituted in the example described by a MOS-FET transistor controlled by the signal Ca of FIG. 2.

The intermediate integration circuit Di is connected by the potential barrier Ei to the signal input of the switch N. In the example described, the potential barrier Ei has a FET transistor, the drain of which is connected to the measuring circuit M and to the switch N, and the gate of which receives the signal Cc shown in FIG. 2. The height of the potential barrier Ei can have two values V1 and V0. When the height has the value V1, only the charges such that the potential of the circuit Di exceeds V1 are collected by the drain. When the height has the value V0, all the charges contained in the circuit Di flow into the drain. V1 is adjusted in such a way that, in normal operation, i.e. without any dazzling of the detectors A1–An, the potential of the intermediate integration circuit Di is below V1. Thus, the potential barrier Ei plays the role of a change-over switch.

So long as the potential of the circuit Di (and of the n−1 other corresponding circuits in the n−1 other sequences of circuits) is below V1, the measuring circuit M delivers a signal 0, so much so that the AND gate delivers a signal which is permanently at zero and the inverter Q delivers a signal Cc which is permanently at the value V1.

When the potential of the circuit Di (and/or other circuits among the n−1 corresponding circuits in the n−1 other sequences of circuits) is greater than V1, i.e. if a high amplitude signal is received during one of the 4-second time intervals, then charges overflow into the drain and the measuring circuit M delivers a signal 1. Thus the AND circuit P no longer delivers a signal which is permanently at zero but a signal which assumes the value 1 during a first part of the 1-microsecond durations of the signal Ca, i.e. a signal that copies the signal Cb of FIG. 2. The height of the barrier Ei (and of the n−1 other corresponding barriers) is then lowered, by the inverter Q, to the value V0, while the signal Cb takes the value 1, as is shown by the signal Cc of FIG. 2. The result thereof is that, outside normal operation, the AND gate, in letting through the signal Cb, opens the barrier Ei (and the n−1 other barriers) and closes the switch N, thus emptying the intermediate integration circuits such as Di.

During a second part of the 1-microsecond durations of the signal Ca, determined by the pulses of the signal Cd of FIG. 2, if the charges contained in the intermediate integration circuit Di have not been emptied through the switch N, they are transferred into the main integration circuit Ji by the transfer circuit Gi. The charges contained in the main integration circuit Ji are then transferred by the multiplexer K in an output line S. The transfer is activated by the signal Ce, the frequency of which is equal to $(64 \times 10^{-6})^{-1}$ xn.

The invention is not limited to the example that has just been described. It is thus, in particular, that each of the n sequences of circuits that go from a detector to an input of the multiplexer may have its own means to empty the contents of its intermediate integration circuit when its detector undergoes dazzling. An approach such as this is obviously costlier, but makes it possible to empty only those integration circuits that belong to a sequence of circuits whose sensor has been dazzled.

It is also possible, in each sequence of circuits, during normal operation, to keep the last value of the charge contained in the intermediate integration circuit in memory when this charge is being transferred. The purpose of this is not to prevent any transfers, during abnormal functioning, into the main integration circuit but rather to enable the transfer of the last value in memory pertaining to the sequence of circuits considered: this could be done, for example, by the emptying, for this purpose, of the intermediate integration circuit only up to the value contained in the memory.

In general, the invention can be applied to any camera with optomechanical scanning whether its detector is a thermal detector or whether it works in the visible or ultraviolet range, as well as to any camera without optomechanical scanning, using a detector formed by a two-dimensionsal mosaic of sensors working in the infra-red, visible or ultra-violet ranges.

What is claimed is:

1. A detection system having electronic protection against countermeasures, comprising:
   n sensors, n being a positive integer, for producing charges depending on an amount of energy imparted on the sensors;
   n first integration circuits, respectively connected to the sensors, for accumulating the charges produced by the respective sensors;
   n second integration circuits, selectively connected to the n first integration circuits;
   measuring means, connected to the first integration circuits, for measuring the accumulated charges within the first integration circuits;
   comparing means, connected to the measuring means, for comparing the measured accumulated charges with a predetermined charge quantity and outputting a signal when the measured accumulated charges are greater than a predetermined charge quantity; and
   protection means, connected to the comparing means and the n first integration circuits, for protecting the n second integration circuits by reducing the accumulated charges of at least one of the n first integration circuits and preventing all of the accumulated charges from said at least one of the n first integration circuits from reaching and damaging at least one of said n second integration circuits when said comparing means outputs said signal.

2. A system according to claim 1, wherein the protection means empties at least part of the accumulated charges within each of said first integration circuits when said comparing means outputs said signal.

3. A system according to claim 1, further comprising:
   n transmitting means, respectively connected between said n first integration circuits and said n second integration circuits, for transmitting the charges in said n first integration circuits to said n second integration circuits; and
   wherein said n transmitting means transmit the charges accumulated within said n integration circuits at a first frequency and said n second integration circuits transmit the charges accumulated therein at a second frequency which is lower than the first frequency.

4. A system according to claim 1, wherein said protection means performs said protecting and said preventing only when said comparing means outputs said signal.

* * * * *